Oct. 2, 1956  J. A. CUPLER II  2,764,967
APERTURE FORMING METHOD AND APPARATUS
Filed Oct. 4, 1952
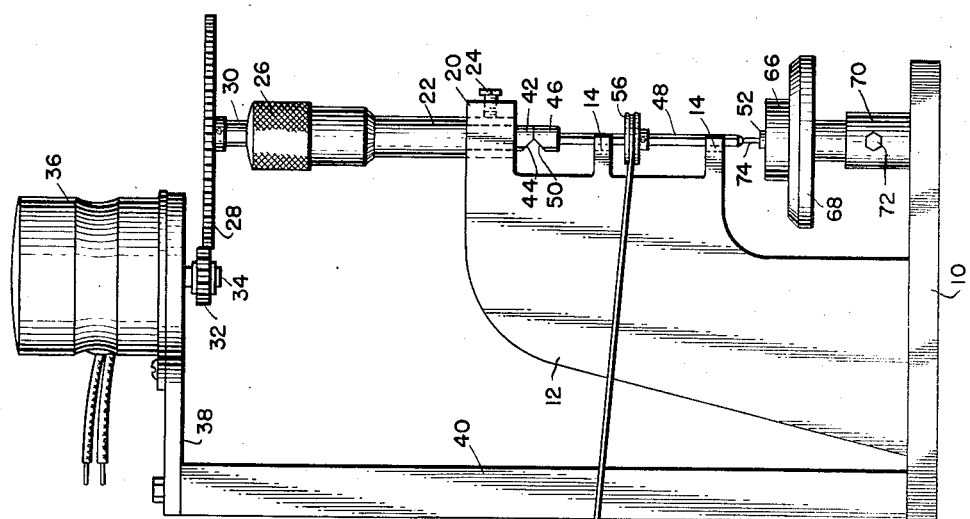
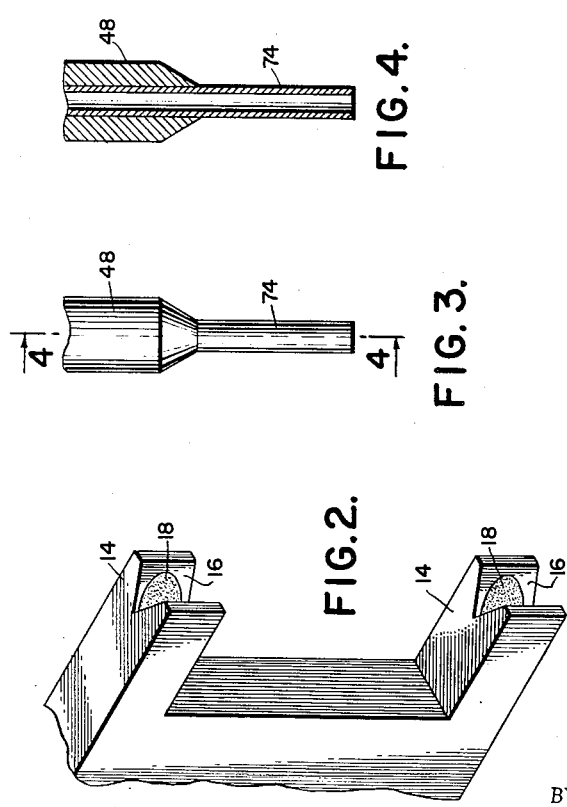
*INVENTOR*
John A. Cupler II
BY Raymond W. Colton
*ATTORNEY*

United States Patent Office 2,764,967
Patented Oct. 2, 1956

2,764,967

APERTURE FORMING METHOD AND APPARATUS

John A. Cupler II, Cumberland, Md.

Application October 4, 1952, Serial No. 313,180

15 Claims. (Cl. 125—30)

Heretofore, this country has been almost entirely dependent upon foreign sources for its jewel bearings requirements for watches and precision instruments. Whereas this situation has prevailed over many years, it has begun to constitute a serious problem in connection with our defense position. As a matter of fact, our military position would be seriously impaired were we to be cut off from the present source. According to a review of this condition, published in the New York Times on August 14, 1952, approximately one hundred million of these jewels are imported each year as compared with our own maximum production during the last war of only five million per year. To complicate this problem, there has been little incentive to establish an adequate source of jewel bearings in this country since, due to wage differentials, they can be imported at an average cost of eight cents each as compared with a twenty-five cent unit cost of the domestic products.

After extended research directed to the problems involved, the present inventor has found that jewel bearings can be produced in this country competitively with those manufactured abroad. This achievement relies upon a novel method and apparatus making possible for the first time the application of production techniques for the somewhat primitive family group procedures practiced by our present sources.

Accordingly, it is an object of this invention to provide an aperture forming apparatus comprising a frame, a tool support and a work supporting member carried by the frame, a tool member received in the support, rotating and reciprocating means relatively driving the members, and feeding means adjustably rigidly mounted with respect to the frame engageable with one of the members for relatively advancing the tool member positively with respect to a work-piece. The feeding means is connected with driving means which effects a continuous adjustment thereof at a constant rate. The tool member preferably assumes the form of a tubular lap which may be rotated or fixed so long as it engages in relative rotation with respect to the work. The use of a heat-hardened work engaging portion for the tool member has been found to be particularly desirable for increased life of the tool member. The reciprocation can likewise be applied to either the tool member or the work supporting member so long as the relative reciprocating motion is produced and the stroke is sufficient to completely separate the tool member and work supporting member during each reciprocation.

The reciprocating effect is produced by means of a cam which may be driven by the same means employed to drive the tool member or by a separate driving means, depending somewhat upon the relative rates of rotation and reciprocation desired. The tool member or work supporting member, whichever is to be advanced by the feeding means, is urged toward the feeding means by suitable biasing means. Since the very small sizes characterizing this art require close tolerances, the use of spaced pairs of notch-forming surfaces is highly desirable for supporting moving parts. Such surfaces have been disclosed for comparable purposes in a patent relating to drilling machines, No. 2,607,244, dated August 19, 1952.

The method contemplated by this invention comprises relatively rotating and reciprocating a jewel with respect to a tool, providing a dwell period while the jewel and tool are most proximate during each reciprocation, and throughout each dwell period continuously advancing the jewel relatively to a portion of the tool at a constant rate. The method also contemplates separation of the jewel and tool during a portion of each reciprocation and an aggregate dwell during each reciprocation exceeding 120° of rotation. A very important aspect of both the method and apparatus is the positive advancing force applied to the tool relative to the work which is in bold contrast to the usual types of advancing forces which rely upon weights, springs and flexible transmitters of such forces. On the other hand, a yieldable retracting force to separate the tool from the work is employed in many applications of the of the present invention.

A more complete understanding of the invention will follow from a discussion of the accompanying drawings wherein:

Fig. 1 is an elevation depicting a somewhat elementary form of apparatus with which highly satisfactory results have been achieved;

Fig. 2 is a fragmentary isometric view, on an enlarged scale of a portion of the apparatus shown in Fig. 1;

Fig. 3 is a fragmentary elevation on an enlarged scale of the tool member shown in Fig. 3; and Fig. 4 is a sectional elevation taken along line 4—4 of Fig. 3.

The apparatus depicted in Fig. 1 of the drawings comprises a base 10 supporting a column 12 which provides a pair of horizontal projections 14, notched at their ends to form V-type supporting surfaces 16 containing, if desired, inserts 18, formed from natural or synthetic jewels such as sapphires or rubies so that the actual bearing surfaces defined thereby will be durable. All of these surfaces 16 lie in two planes.

The column 12 also provides an upper horizontal projection 20, overhanging the others, to which an internally threaded sleeve 22 is secured by means of a set screw 24. An externally threaded member having a head 26 is received by the internally threaded member 22 and rotated with respect thereto by a spur gear 28 secured to an extension 30 of the head 26, which is driven by a pinion 32 secured to the shaft 34 of a motor 36. The motor is supported on a plate 38 carried by one or more posts 40 secured to the base 10.

Actually, the internally threaded member 22 and its cooperating externally threaded member 26 as shown in the drawings, constitute a portion of a micrometer caliper adapted for use in conjunction with this invention. It will thus be understood that the pitch of the thread involved is quite small so that the rate of advance of one of the members with respect to the other can be maintained slow and precise. As the externally threaded member is advanced, its lower end 42 provided with a cam surface 44 imposes a positive abutment for the upper end 46 of a tool member 48. The upper end of the tool member is likewise provided with a cam surface 50 for cooperation with the cam surface 44 so that for each revolution of the tool member as depicted in the drawings, there will be one complete reciprocation of the tool member. Moreover, the cam surfaces are so designed that when the tool member 48 is most proximate to the work 52, there will be a dwell period aggregating at least 120° of each revolution. The tool member 48 is received in the spaced pairs of notch-forming surfaces 16 and maintained in contact therewith by a flexible belt 54 threaded about a pulley 56 carried by the tool member and about a stepped pulley 58 secured to a shaft 60 of a motor 62 whose base 64 is maintained in spaced relationship to the base 10.

The work 52 is carried by a work support 66 received on a work table 68 whose height is adjustable with respect to a hollow post 70 mounted on the base 10, a set screw 72 maintaining these parts in a desired adjusted relationship.

The tool member 48 and particularly its lower end 74, as clearly shown in Fig. 4, is tubular so that the material removed from the work by rotation and reciprocation of the tool will produce an annular groove. The apparatus thus described is used with a suitable abrasive composition such as a diamond composition which may be fed to the tool and work through the hollow tubular lap or around it. Inasmuch as the tool and the work are separated once during each reciprocation, it will follow that the abrasive composition will be rapidly renewed between the opposed tool and work surfaces.

It is highly important that the abutment 42 be advanced continuously and at a substantially constant rate during the abrading operation and that the abutment be a rigid one. This requirement is in sharp contrast to conventional types of drilling and lapping equipment which employ springs, weights, flexible transmitters and manual feeds, none of which is positive in nature and none of which is continuous and constant in its rate.

The tool member 48 moves upwardly during each reciprocation due to the biasing effect of the flexible belt 54 whose left end, as shown in the drawings, is maintained above the level of its right end. This attitude of the belt maintains the tool member in the uppermost positions permitted at any instant by the cam surfaces 44 and 50. At its working or lower end 74, the tool member 48, which may be steel, is preferably heat-hardened to improve its operation and extend its life.

Whereas only one simple form of the method and apparatus contemplated have been illustrated, those skilled in the art will understand therefrom that, for example, the work instead of the tool member can be rotated and/or reciprocated, that the rate of reciprocation can differ from the rate of rotation, that the speed at which the tool member and work supporting member are relatively advanced can vary to suit the materials employed. Accordingly, the invention should not be restricted to the structure illustrated and described beyond the scope of the appended claims.

I claim:

1. Aperture forming apparatus comprising a frame, a tool support and a work supporting member carried by said frame, a tool member received in said support, rotating and reciprocating means relatively driving said members, feeding means adjustably rigidly mounted with respect to said frame engageable with one of said members for relatively advancing said tool member positively with respect to a work-piece, and driving means continuously operating said feeding means.

2. Aperture forming apparatus as set forth in claim 1 wherein said driving means operates said feeding means at a constant rate.

3. Aperture forming apparatus as set forth in claim 1 wherein said tool member provides a tubular work engaging portion.

4. Aperture forming apparatus as set forth in claim 1 wherein said tool member terminates in a heat-hardened tubular work engaging portion.

5. Aperture forming apparatus as set forth in claim 1 wherein rotation is imparted to said tool member.

6. Aperture forming apparatus as set forth in claim 1 wherein said tool member is reciprocated.

7. Aperture forming apparatus as set forth in claim 1 wherein said tool member is rotated and reciprocated.

8. Aperture forming apparatus as set forth in claim 1 wherein said reciprocating means includes a cam.

9. Aperture forming apparatus as set forth in claim 1 wherein biasing means engaging one of said members maintains it in contact with said feeding means.

10. Aperture forming apparatus as set forth in claim 1 wherein said tool member is a hollow lap.

11. Aperture forming apparatus as set forth in claim 1 wherein said tool support comprises spaced pairs of notch-forming surfaces.

12. A method of forming apertures in jewels comprising relatively rotating and reciprocating a jewel axially with respect to a tool, providing a dwell period while said jewel and tool are most proximate during each reciprocation, and throughout each dwell period continuously advancing said jewel relative to a portion of said tool at a constant rate.

13. A method as set forth in claim 12 wherein said jewel and tool are separated during a portion of each reciprocation.

14. A method as set forth in claim 12 wherein each reciprocation includes an aggregate dwell exceeding 120° of rotation.

15. A method as set forth in claim 12 wherein each reciprocation includes a positive advancing force and a yieldable retracting force.

References Cited in the file of this patent

UNITED STATES PATENTS

| Number | Name | Date |
|---|---|---|
| 463,973 | Palmer | Nov. 24, 1891 |
| 2,292,550 | Simons | Aug. 11, 1942 |
| 2,373,850 | Pierce | Apr. 17, 1945 |
| 2,388,610 | Hanemann | Nov. 6, 1945 |
| 2,391,983 | Kutzler | Jan. 1, 1946 |
| 2,580,398 | Braswell | Jan. 1, 1952 |
| 2,607,244 | Cupler | Aug. 19, 1952 |
| 2,627,261 | Cox et al. | Feb. 3, 1953 |